United States Patent
Sunter et al.

(10) Patent No.: US 11,014,257 B2
(45) Date of Patent: May 25, 2021

(54) METHOD AND APPARATUS FOR REMOVING FOREIGN OBJECTS FROM FOOD PIECES

(71) Applicant: ISHIDA EUROPE LIMITED, West Midlands (GB)

(72) Inventors: Adrian Sunter, Worcestershire (GB); Robert Bennett, West Midlands (GB)

(73) Assignee: ISHIDA EUROPE LIMITED, West Midlands (GB)

( * ) Notice: Subject to any disclaimer, the term of this patent is extended or adjusted under 35 U.S.C. 154(b) by 457 days.

(21) Appl. No.: 15/321,703

(22) PCT Filed: Jun. 26, 2015

(86) PCT No.: PCT/GB2015/051863
§ 371 (c)(1),
(2) Date: Dec. 22, 2016

(87) PCT Pub. No.: WO2015/198062
PCT Pub. Date: Dec. 30, 2015

(65) Prior Publication Data
US 2017/0151686 A1    Jun. 1, 2017

(30) Foreign Application Priority Data

Jun. 27, 2014  (GB) ...................... 1411508

(51) Int. Cl.
*B26D 5/00* (2006.01)
*B26D 7/06* (2006.01)
(Continued)

(52) U.S. Cl.
CPC .......... *B26D 5/007* (2013.01); *A22C 17/0086* (2013.01); *A22C 17/0093* (2013.01);
(Continued)

(58) Field of Classification Search
CPC ..... B26F 3/004; A22C 17/002; A22C 17/006; A22C 17/0073; A22C 17/008; A22C 17/0086; Y10T 83/364; Y10T 83/0591; Y10T 83/178; Y10T 83/543; Y10T 83/175; Y10T 83/141; B26D 7/18; B26D 7/1818; G01N 2223/618
(Continued)

(56) References Cited

U.S. PATENT DOCUMENTS 4,970,757 A   11/1990   Heiland et al.
5,585,603 A   12/1996   Vogeley, Jr.
(Continued)

FOREIGN PATENT DOCUMENTS

EP   2353395 A1   8/2011
EP   2636495 A1   9/2013
(Continued)

*Primary Examiner* — Laura M Lee
(74) *Attorney, Agent, or Firm* — Squire Patton Boggs (US) LLP

(57) ABSTRACT

A method of removing a foreign object from a food piece detects the location of a foreign object in a food piece (10);
(Continued)

conveys the food piece to a cutting tool (42); and operates the cutting tool to cut around the detected location of the foreign object and subsequently to engage and eject the foreign object from the food piece.

21 Claims, 7 Drawing Sheets

(51) Int. Cl.
| | |
|---|---|
| B26F 1/38 | (2006.01) |
| A22C 17/00 | (2006.01) |
| B26D 5/32 | (2006.01) |
| B26F 3/00 | (2006.01) |
| A22C 21/00 | (2006.01) |
| G01B 15/00 | (2006.01) |
| G01N 23/00 | (2006.01) |

(52) U.S. Cl.
CPC ...... *A22C 21/0053* (2013.01); *A22C 21/0069* (2013.01); *B26D 5/32* (2013.01); *B26D 7/0625* (2013.01); *B26F 1/3813* (2013.01); *B26F 3/004* (2013.01); *G01B 15/00* (2013.01); *G01N 23/00* (2013.01); *B26D 2210/02* (2013.01); *G01N 2223/618* (2013.01)

(58) Field of Classification Search
USPC ............... 83/371, 76.7, 76.8, 102, 112, 137, 83/162–166, 177; 348/46
See application file for complete search history.

(56) References Cited

U.S. PATENT DOCUMENTS

| | | | | |
|---|---|---|---|---|
| 5,937,080 | A * | 8/1999 | Vogeley, Jr. | A22B 5/007 382/110 |
| 7,153,203 | B2 * | 12/2006 | Pfarr | B23K 26/0838 452/150 |
| 8,167,136 | B2 * | 5/2012 | Betti | B26D 7/18 198/588 |
| 9,095,147 | B2 * | 8/2015 | Hjalmarsson | A22C 17/0086 |
| 9,138,781 | B1 * | 9/2015 | Strong | B07C 1/00 |
| 2008/0276777 | A1 * | 11/2008 | Blaine | A21C 11/10 83/401 |
| 2011/0147347 | A1 * | 6/2011 | Maurer | B23K 26/073 219/121.18 |
| 2015/0033921 | A1 * | 2/2015 | Finnsson | A22C 17/002 83/73 |
| 2016/0075045 | A1 * | 3/2016 | Mikkelsen | B26D 7/0625 83/23 |

FOREIGN PATENT DOCUMENTS

| | | |
|---|---|---|
| WO | 9205703 A1 | 4/1992 |
| WO | 0243502 A2 | 6/2002 |
| WO | 08102148 A1 | 8/2008 |

\* cited by examiner

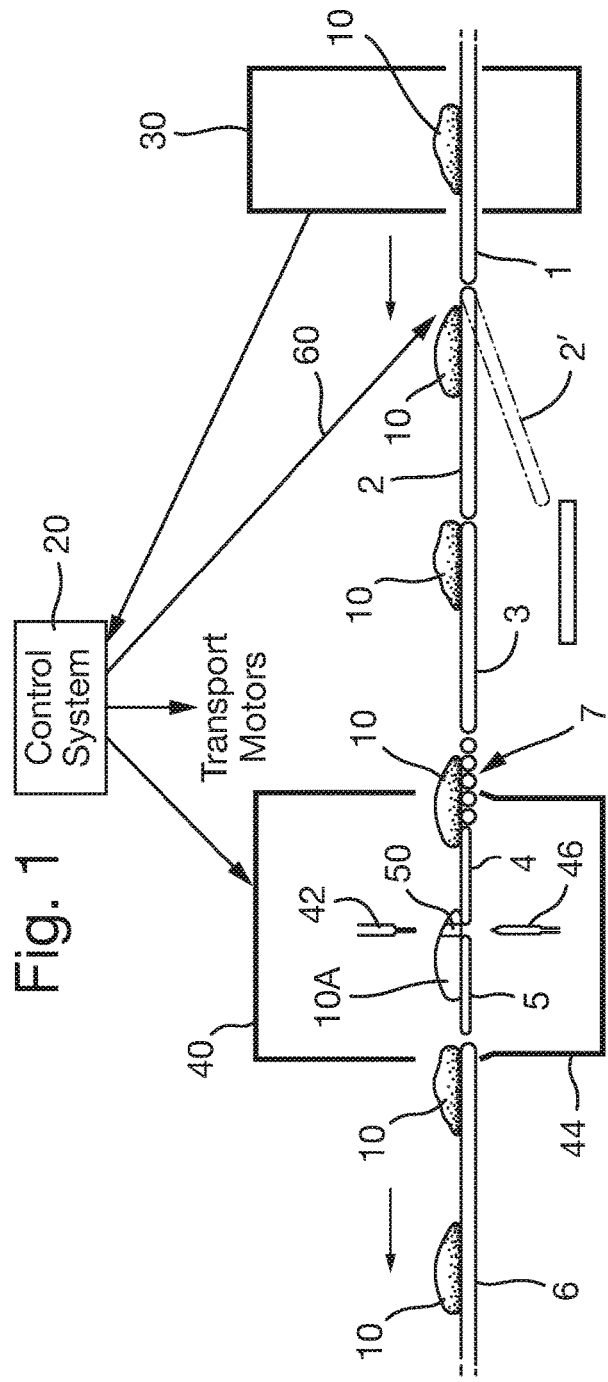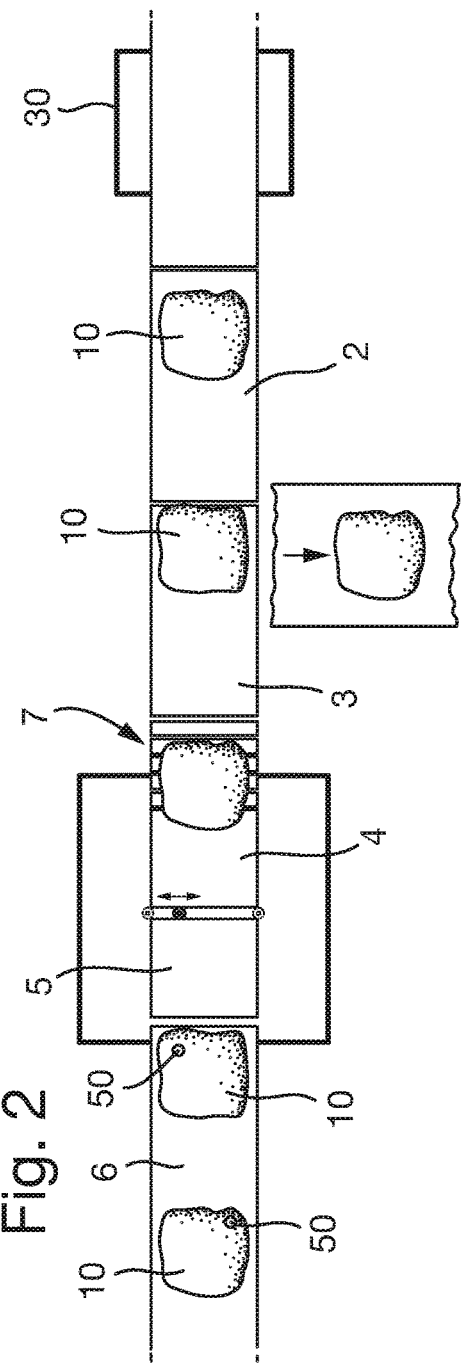

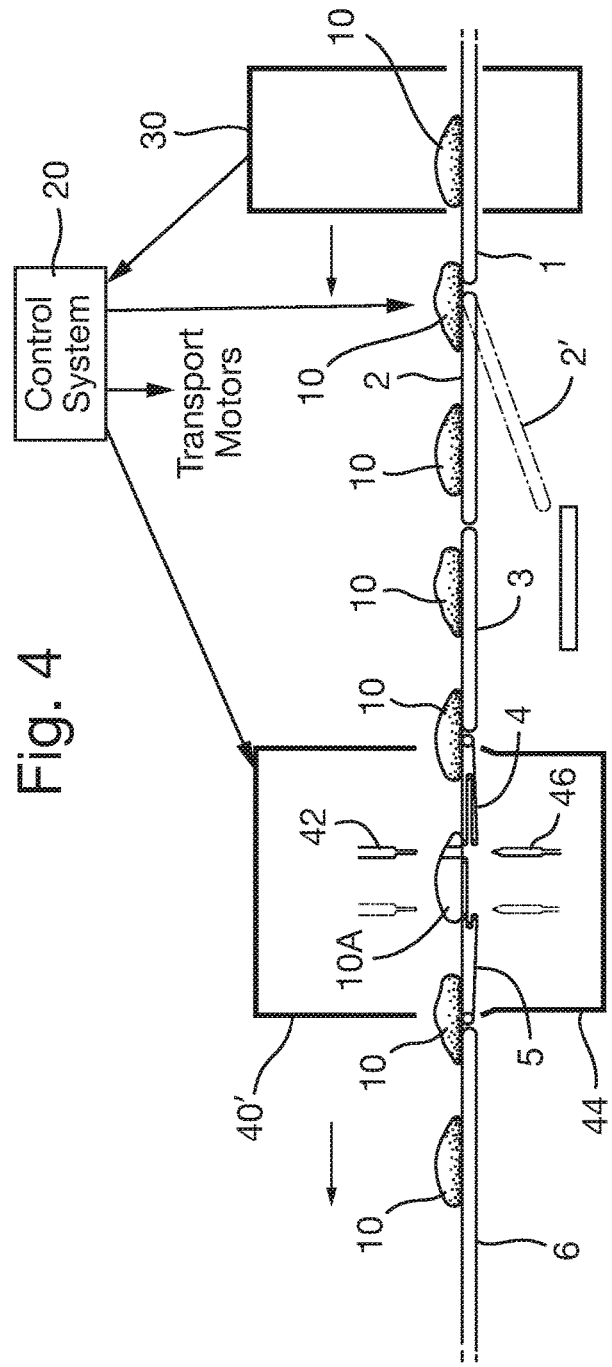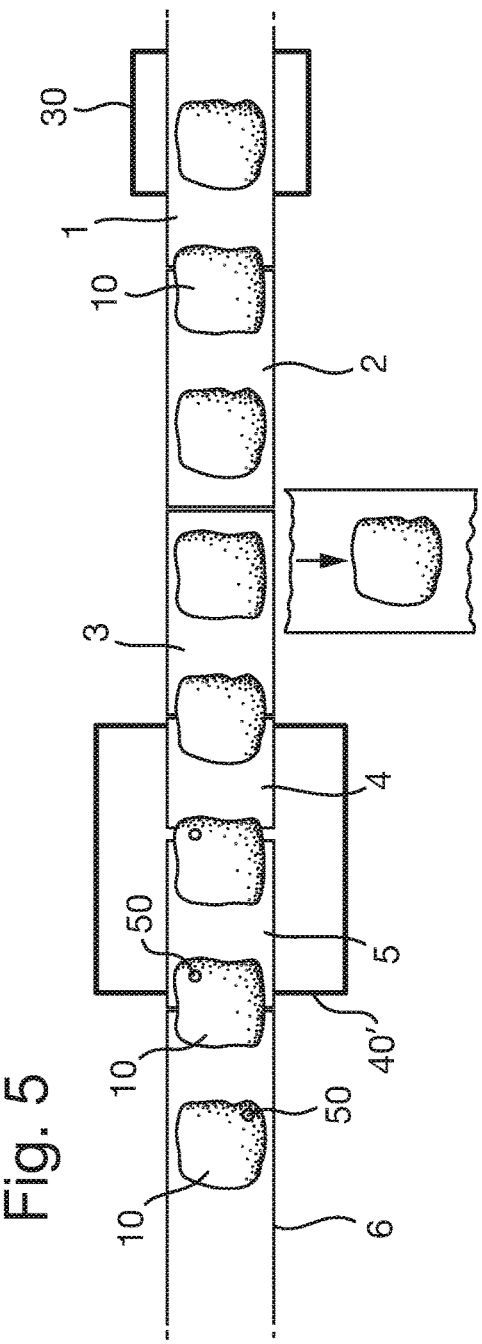

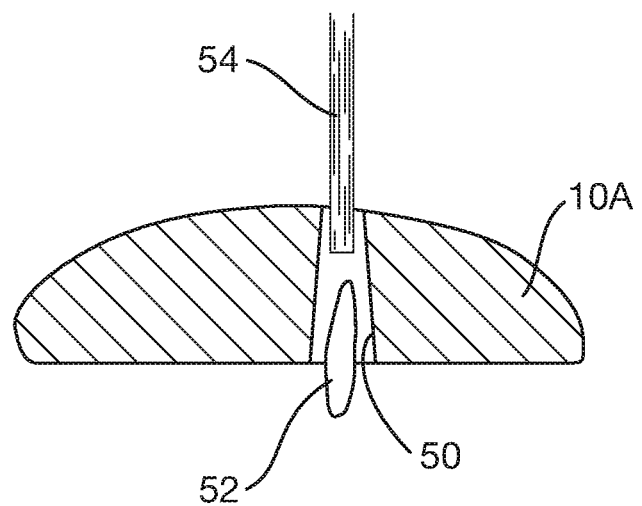

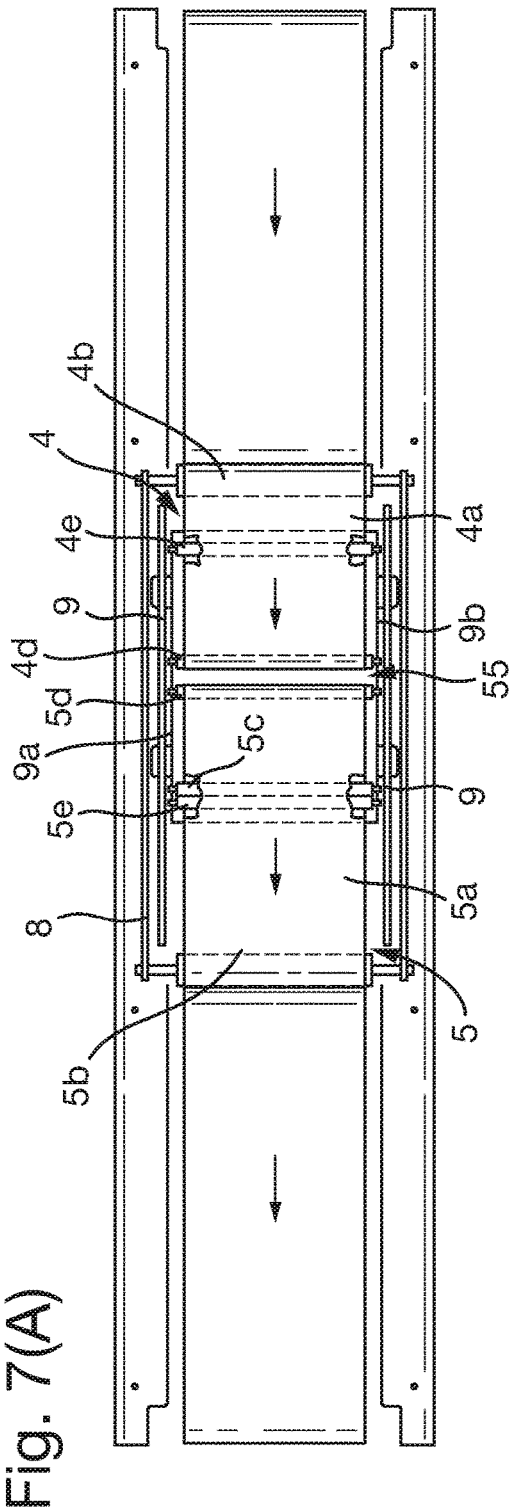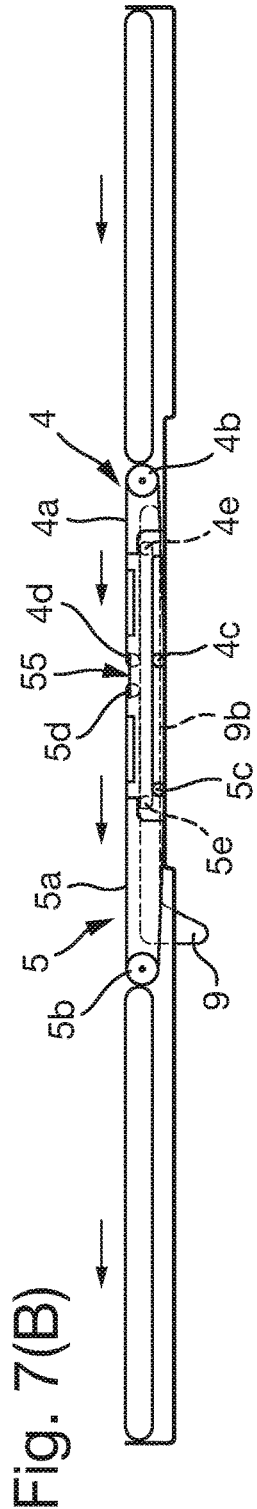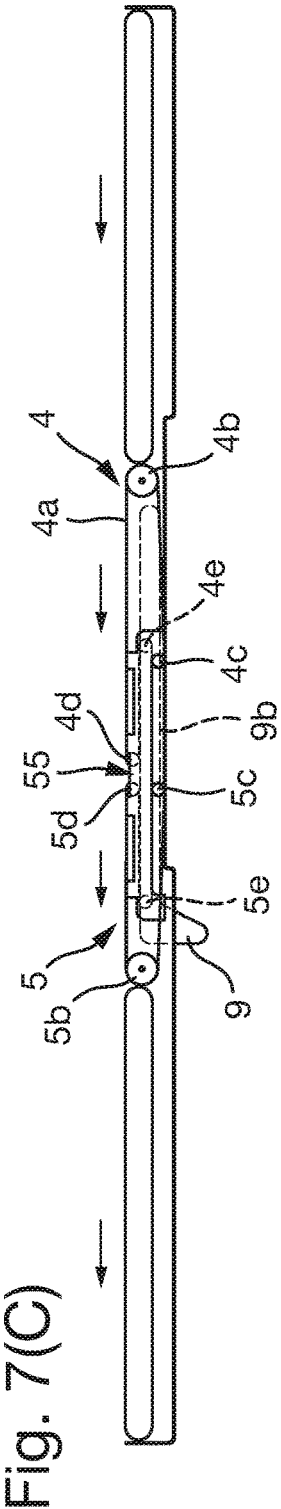

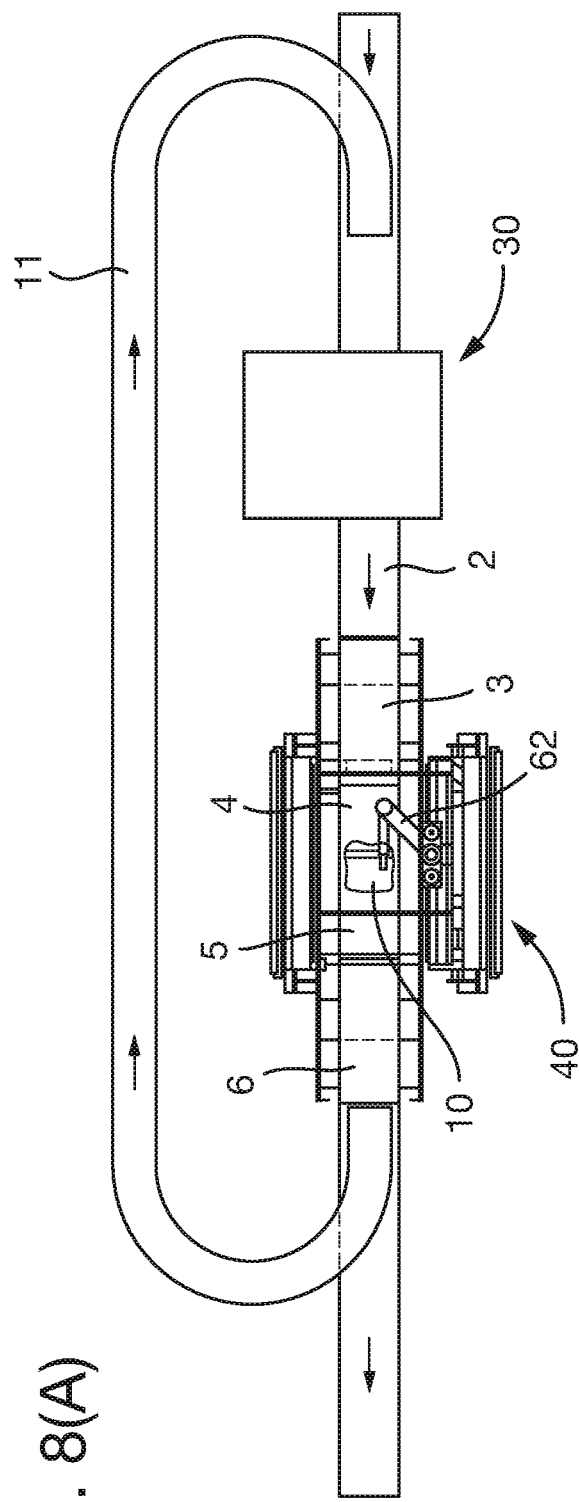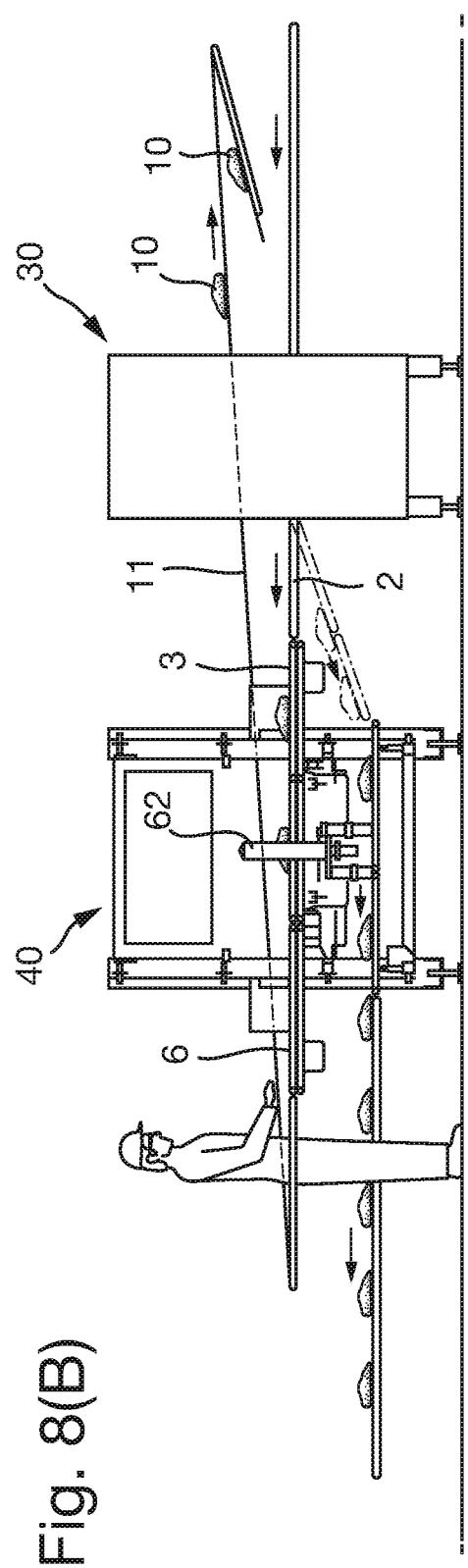
Fig. 8(A)
Fig. 8(B)

METHOD AND APPARATUS FOR REMOVING FOREIGN OBJECTS FROM FOOD PIECES

The invention relates to a method and apparatus for removing foreign objects from food pieces, for example bone pieces from meat such as poultry.

In the food industry, it is becoming more and more important to provide food pieces, such as raw meat and the like, which do not contain foreign objects such as bone. Conventionally, food pieces have been transported through an X-ray unit which can carry out an X-ray analysis of the food piece and provide a display on the unit to indicate the location of foreign objects such as bone, metal pieces and the like. If a foreign object is detected, an indication is provided by the display that a foreign object is present. The food piece then has to be removed from the transport system, inspected by an operator who will then attempt to locate the foreign object and remove it. Raw meat cuts in which unacceptable levels of bone can be found include pork belly and loin but also beef.

In our earlier patent application, WO-A-20081102148, we describe a semi-automatic method for handling food pieces in which the location of a foreign object in a food piece is detected using X-ray analysis and a mark or other indicator is provided to an operator to enable the operator to manually remove the foreign object. This led to more streamlined processing of food pieces but still required significant manual input. In this specification, we also mention the possibility that the foreign object removal machine could respond automatically to the indication to locate and remove the foreign object. However, no explanation was given as to how this could be achieved and it has never been implemented.

In accordance with a first aspect of the present invention, a method of removing a foreign object from a food piece comprises detecting the location of a foreign object in a food piece; conveying the food piece to a cutting tool; operating the cutting tool to cut around the detected location of the foreign object and subsequently to engage and eject the foreign object from the food piece.

In accordance with a second aspect of the present invention, a food piece handling assembly comprises an analysis unit for detecting the location of a foreign object in a food piece; a cutting tool; a transport system for transporting food pieces from the analysis unit to the cutting tool; and a control system for controlling the transport system and cutting tool and responsive to the detected location of a foreign object in a food piece to operate the cutting tool to cut around the detected location of the foreign object and subsequently to engage and eject the foreign object from the food piece.

We have realized that the cutting tool can be used in a very simple way to achieve automatic removal of the foreign object from a food piece so that not only does the cutting tool cut around the detected location of the foreign object but it subsequently engages the foreign object and ejects the foreign object from the food piece. The process does not rely on other factors such as gravity or the use of robotic clamps or the like to remove the object but simply the use of the cutting tool itself.

In some cases, the cutting tool could be in the form of a knife or other sharp edged instrument but preferably comprises a liquid jet such as a water jet. This is particularly advantageous during the ejection step since the liquid jet has a larger cross section than say a knife and can therefore engage the foreign object more easily. The use of water ensures that no further contaminates are introduced into the food piece.

It is, of course, known to use a water jet to remove meat from a bone in order to recover the meat for packaging and the like but it has not previously been recognized that small foreign objects can be removed from food pieces such as meat products using a cutting tool while leaving the rest of the food piece undamaged and intact.

The detection of the location of the foreign object in a food piece can be achieved using any conventional method but X-ray analysis is particularly preferred. The detection step can define the location as the position of the foreign object with respect to a plan view of the food piece or more accurately by defining its position within the food piece, for example using three-dimensional co-ordinates.

In a particularly preferred approach, the shape of the foreign object is also determined. One advantage of determining the shape of the foreign object is that it allows the cut to be shaped to correspond to the foreign object, thereby reducing waste.

Although in theory the food piece could be manually transported from the position at which the foreign object location is detected to the cutting tool, there is significant difficulty in ensuring that the location of the foreign object can be accurately determined by the cutting tool since the orientation of the food piece will have changed. Preferably, therefore, the method is performed automatically with co-ordinates of the foreign object location being transmitted to the cutting tool and the food piece being transported to the cutting tool by a transport system.

In some examples, the cutting step is carried out while the food piece is being conveyed, the cutting tool being moved in a controlled manner in a direction transverse to the direction of movement of the food piece. Movement of the cutting tool could be sliding movement or more typically via a robot controlled arm.

In other examples, the cutting step is carried out by moving the cutting tool along two different axes, preferably orthogonal. Again, this can be achieved using a dual slide mounted arrangement but preferably uses a robot arm capable of moving in at least two dimensions.

In some cases, all food pieces being processed could be transported via the analysis unit and cutting tool. However, since most food pieces will not include foreign objects, it is preferable that following the detection step, food pieces are transported along a first direction towards the cutting tool if a foreign object is detected and along a second, different direction if no foreign object is detected, thereby bypassing the cutting process.

The invention is primarily concerned with the detection of bone pieces in meat, particularly poultry such as chicken or turkey although it is applicable more widely to other food pieces and other foreign objects.

Some examples of methods and apparatus according to the invention will now be described with reference to the accompanying drawings, in which:

FIGS. 1 and 2 are schematic side and plan views of a first example of the apparatus, FIG. 1 also illustrating the control system in schematic detail;

FIGS. 4 and 5 are views similar to FIGS. 1 and 2 respectively but of a second example;

FIG. 6 illustrates schematically a food piece with a foreign object being removed;

FIGS. 7A, 7B and 7C are a plan view and two cut-away side views respectively of the conveyor inside the cutting tool, shown in FIGS. 1, 2, 3A, 4 and 5, with FIGS. 7A and 7B showing the conveyor in a first position and FIG. 7C showing the conveyor in a second position;

FIGS. 8A and 8B show schematic plan and side views of the apparatus shown in FIGS. 1 to 5 and 7A to 7C, including the conveyors for conveying food pieces to and from the apparatus.

Figure 3A:
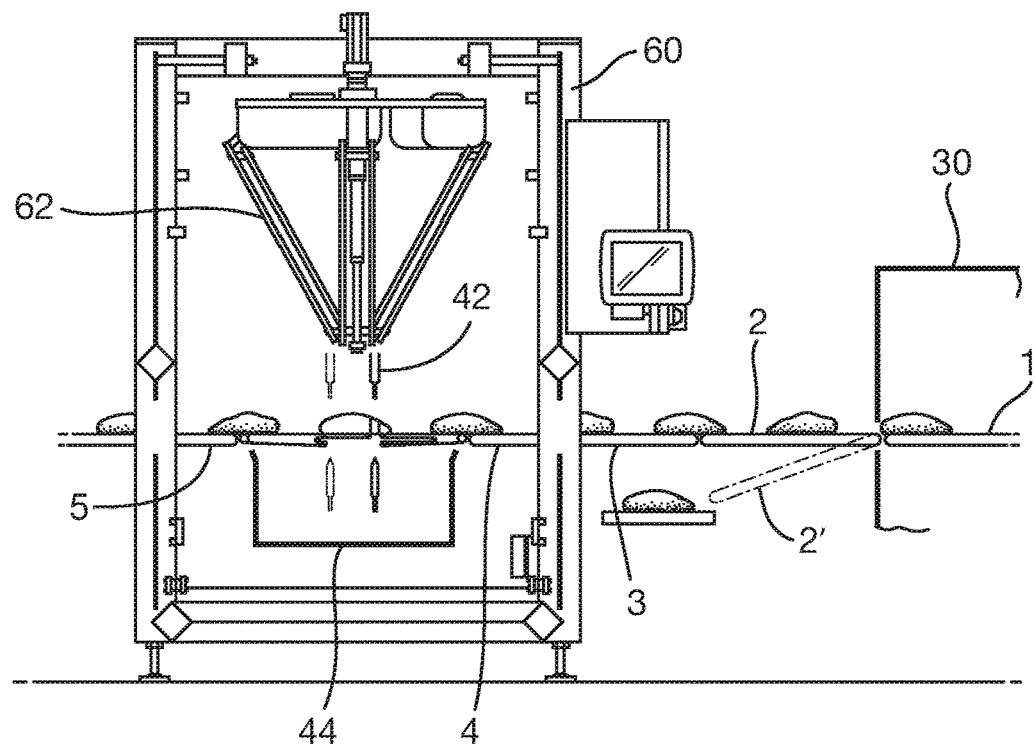
FIGS. 3A and 3B are side and front views respectively of the cutting tool shown in FIGS. 1 and 2.

The food piece handling assembly shown in FIGS. 1 and 2 comprises a transport system formed by a sequence of conveyor belts 1-6 arranged end to end so as to convey food pieces 10, some of which are shown in the drawings. Acceleration rollers 7 are provided between the conveyor belts 3,4. The conveyor belts 1-6 and acceleration rollers 7 are controlled by a number of transport motors (not shown) from a control system 20.

An X-ray analysis machine 30 is provided at the upstream end of the conveyor system, the conveyor belt 1 extended through the X-ray machine. An example of a suitable X-ray analysis device is the IX-GA series X-ray inspection system manufactured and sold by Ishida Europe Limited. The device comprises an X-ray unit for exposing a food piece 10 such as a meat cut to X-ray irradiation, sensing the resultant radiation and using this to determine the 3D co-ordinates of a foreign object such as a bone piece within the food piece. Alternatively, it could determine the location with respect to a plan view of the food piece. In a particularly preferable embodiment, the information gathered from the X-ray analysis is passed to the control system 20 in the form of a bit map, which highlights the location of the foreign object.

The food piece is conveyed through the X-ray machine 30 at a speed of about 300 mm per second and is transferred successively onto conveyors 2,3. The food piece 10 then transfers onto the acceleration rollers 7 which accelerate the feed speed up to a speed in the range 400-600 mm per second at which the food pieces are transferred onto the conveyor 4 and subsequently the conveyor 5 located within a water jet cutting tool assembly 40.

The water jet cutting tool assembly 40 comprises a water jet nozzle 42 (to be described in more detail below) located above the conveyors 4,5 on a robot arm; a water holding tank 44 located beneath the conveyors 4,5 and optionally a water jet collection tube 46 located under the nozzle 42, beneath the conveyors 4, 5, on a second robot arm. The collection tube 46 is a tube that catches water from the jet 42 to minimise water retained within the water holding tank 44, the tube extending to an outlet (not shown). The tube opening is covered by a mesh cone which deflects ejected foreign objects to prevent blockage.

The control system 20 receives foreign object co-ordinate information from the X-ray machine 30 defining the location of a foreign object in the food piece 10. The control system 20 then controls the water jet nozzle 42 to cut a hole 50 in the food piece (shown at 10A) around the location of the foreign object. The hole 50 extends through the full thickness of the food piece 10A (as can be seen in FIG. 1) and then the water jet nozzle 42 is controlled to cause the water jet to engage the foreign object and eject it downwardly through a gap 55 in the conveyor.

This is shown in more detail in FIG. 6 which illustrates the food piece 10A. As can be seen in FIG. 6, the bore 50 tapers outwardly in the downward direction to make it easy to release and eject a foreign object 52 such as a bone piece which is engaged by the water jet shown at 54. The bore is tapered due to the natural expansion of the water jet.

While FIG. 6 shows a foreign object 52 being ejected from the centre of the food piece 10A, it will be appreciated that the apparatus disclosed herein may be used to eject foreign objects located anywhere in a food piece. For example, a foreign object located on the edge of the food piece could be removed from the food piece in a similar way, but may not require the water jet to cut around its entirety.

Following removal of the bone piece, the food piece 10A is transported further onto the conveyor 6.

It will be appreciated that the cutting operation takes place while the food piece 10/10A is continuously moving through the cutting tool assembly 40.

In a typical example such as a beef food piece, cutting speeds are typically of the order of 670 mm per second so that cutting a hole of 30 mm diameter at ¾ g (7.35 m/s$^2$) will take about 0.2 seconds.

FIG. 1 illustrates how the conveyor 2 can be pivoted into a position 2' in response to a control signal 60 from the control system 20. In this way, food pieces with no detected foreign objects may be diverted onto a conveyor beneath conveyor 2, to be transported to further processing, thereby resulting in only the pieces with detected foreign objects being conveyed to the cutting tool assembly 40. Advantageously, by diverting 'good' food pieces off the conveyor 2, the food pieces with foreign objects are minimally disturbed, allowing the location of the foreign object to be tracked more precisely to the cutting tool assembly 40. Optionally, the conveyor 2 may also pivot to a reject position (not shown) so as to reject food pieces which have foreign objects too large or too difficult to handle.

As shown in FIG. 8, food pieces which pass through the cutting tool assembly 40 are directed back around on a rework conveyor 11 to again pass through the X-ray machine 30 to ensure the foreign object was successfully removed. If no foreign object is detected, the food piece 10 will then be diverted off the conveyor 2 to further processing. If a foreign object is once again detected, the food piece may be passed through the cutting tool assembly 40 again, or diverted by conveyor 2 to a reject position.

The means of conveying the food piece through the cutting tool assembly 40 will now be described in more detail with reference to FIGS. 7(A) to 7(C). Conveyors 4 and 5 form a "moving gap conveyor" capable of moving a food piece 10 through the water jet cutting tool assembly 40 while the food piece 10 bridges a gap 55 between the conveyors 4, 5. This arrangement allows the food piece 10 to move through the assembly 40 while the detected foreign object is located over the gap 55 between the two conveyors, ready to be ejected by the water jet 42. Each of the conveyors 4, 5 in the moving gap 55 conveyor comprises a conveyor belt 4a, 5a, a large, fixed roller 4b, 5b, a small, fixed roller 4c, 5c, and two small, movable rollers 4d, 4e, 5d, 5e, wherein the movable rollers are rotatably mounted about respective axles that are at fixed spatial positions relative to one another by being mounted between end plates 9a, 9b of a carriage 9a. Both conveyors 4, 5 are connected to the same belt drive 8 and carriage drive 9. The belt drive 8 simultaneously turns the large rollers 4b, 5b of both conveyors 4, 5, which rotates the conveyor belts 4a, 5a about their respective rollers 4b-e, 5b-e. The carriage drive 9 moves first and second end plates 9b, 9c which form the carriage 9a. By moving the carriage 9a left and right, the small movable rollers are moved relative to the fixed rollers thereby moving the gap 55.

The arrangement of the fixed 4b, 4c, 5b, 5c, and movable 4d, 4e, 5d, 5e rollers is such that it ensures that as the gap 55 is moved, the path length of each conveyor belt 4a, 5a around its respective rollers 4b-e, 5b-e remains the same. The first small, movable roller 4d, 5d is positioned horizontally displaced from the large, fixed roller 4b, 5b and at a height which maintains a flat upper surface of the conveyor belt 4a, 5a as it wraps around the two. The second small movable roller 4e, 5e is positioned lower than the first 4d, 5d and horizontally displaced so as to be closer to the large fixed roller 4b, 5b. The small fixed roller 4c, 5c is positioned lower than both of the small movable rollers 4d, 4e, 5d, 5e, horizontally displaced from the large, fixed roller 4b, 5b in the same direction. The conveyor belt path loops around the large roller 4b, 5b, the first small, movable roller 4d, 5d, the second, small movable roller 4e, 5e, the small, fixed roller 4c, 5c, before returning to the large fixed roller. In a first position of the carriage 9a, shown in FIG. 7B, the first small, movable roller 4d, of the first conveyor 4 is directly above the small, fixed roller 4c. In this first position, the second small, movable roller 5e of the second conveyor 5 is approximately above the small, fixed roller 5c. The carriage 9a is movable to a second position, shown in FIG. 7C, in which the second small, movable roller 4e of the first conveyor 4 is approximately above the small, fixed roller 4c. In this second position, the first small, movable roller 5d on the second conveyor 5 is directly above the small, fixed roller 5c. The conveyor belt path length will remain the same providing the carriage 9a is not moved outside of the range between the first and second positions, which would cause a second small, movable roller 4e, 5e to be further from its respective large, fixed roller 4b, 5b than the small, fixed roller 4c, 5c. This configuration of rollers and movement range of the movable rollers ensures that the path length of both conveyor belts 4a, 5a remain the same as the gap 55 is moved.

The belt drive 8 and carriage drive 9 are operable simultaneously and independently. The belt drive 8 drives the conveyors 4, 5 at a constant speed. A food piece 10 brought onto the moving gap conveyor is moved over the gap 55 by the constant rotation of the conveyor belt 4. Once the food piece 10 bridges the gap 55 such that the detected foreign object is over the gap, the carriage drive 9 then drives the carriage 9a, and hence the movable rollers 4d, 4e, 5d, 5e so that the gap 55 tracks the detected foreign object as the work piece moves through the cutting tool assembly 40. Once the foreign object is ejected, the carriage drive 9 moves the carriage 9a, and hence the movable rollers 4d, 4e, 5d, 5e, so that the gap 55 moves back towards the entrance to the cutting tool assembly 40, ready for the next food piece. Meanwhile, the food piece 10 is conveyed out of the cutting tool assembly 40 by conveyor 5.

While the above describes a food piece bridging the gap 55 between the conveyors 4, 5, it will be appreciated that a detected foreign object may be close to a front or rear edge of the food piece, in which case the food piece 10 may sit almost entirely on either of the conveyors 4, 5 while the detected foreign object is held over the gap 55.

In the cutting tool assembly 40, the water jet nozzle 42 is mounted to a robot arm for movement in a single axis orthogonal to the direction of movement of the conveyor belts (as shown in FIG. 2). The nozzle can be suitably controlled by the control system 20 in conjunction with movement of the conveyors 4,5 to cut the desired bore 50.

FIGS. 4 and 5 illustrate a second example of a food piece handling assembly which is substantially the same as the example shown in FIGS. 1 and 2 except that the cutting tool water jet 42 can be moved in two axes orthogonal and parallel respectively to the direction of movement of the conveyors 4,5. It will also be seen in FIG. 4 that the water jet collection tube 46 moves with the nozzle 42. In addition, the acceleration rollers 7 have been omitted.

Figure 3B:
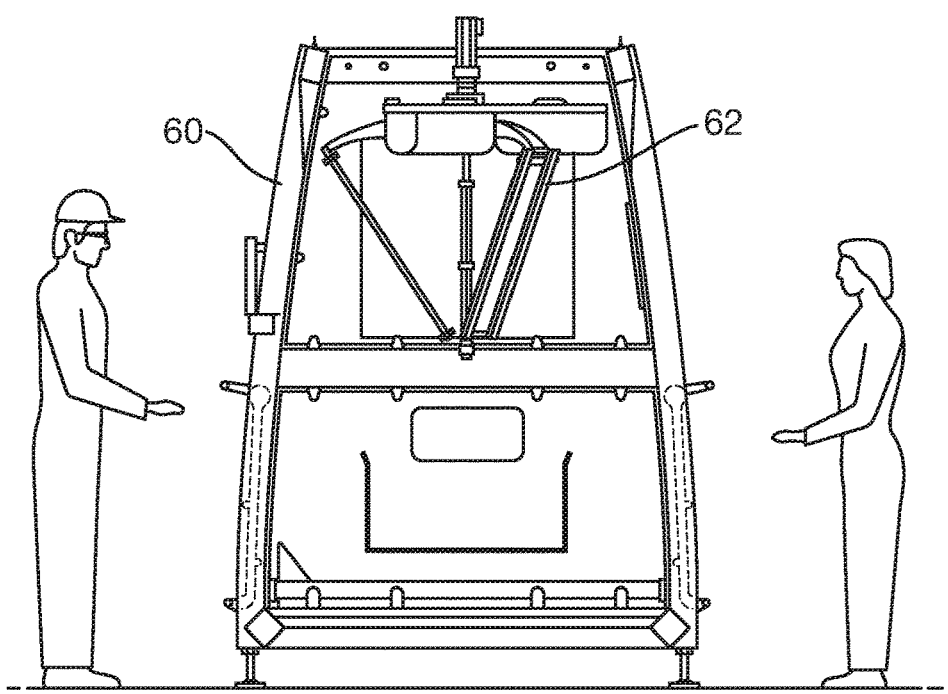

The cutting tool assembly 40' shown in FIGS. 4 and 5 is illustrated in more detail in FIG. 3. The assembly comprises a housing 60 through which the conveyors 4,5 extend. Above the conveyors is suspended a robot arm assembly 62 at the rear end of which the water jet nozzle 42 is mounted. The position of the robot arm 62 is controlled by the control system 20 to move the nozzle 42 along each of two transverse, typically orthogonal axes.

Figure 9A:
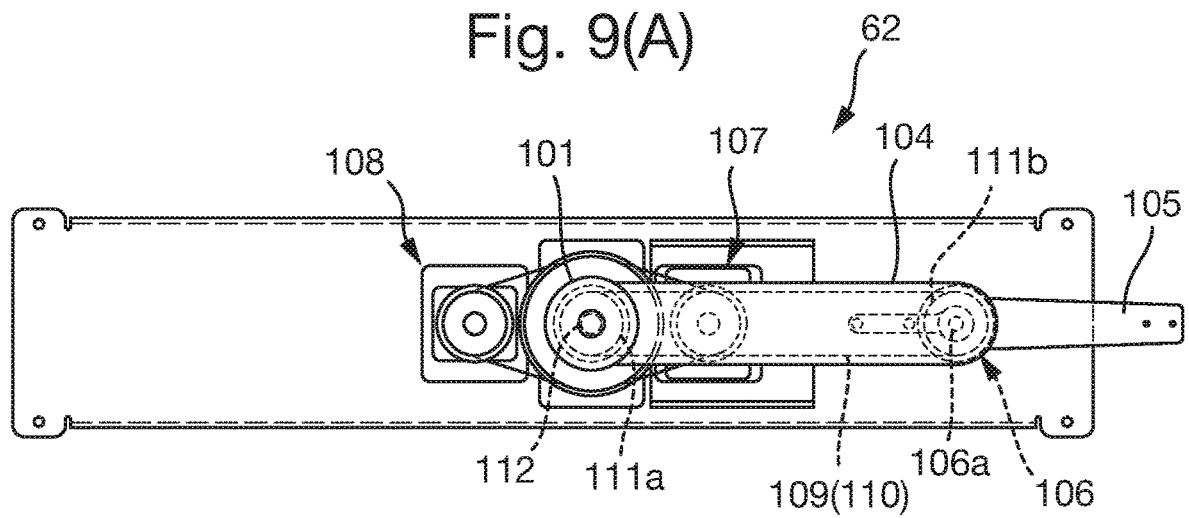
FIGS. 9A and 9B show plan and side views of the robot arm shown in FIGS. 8A and 8B.
Figure 9B:
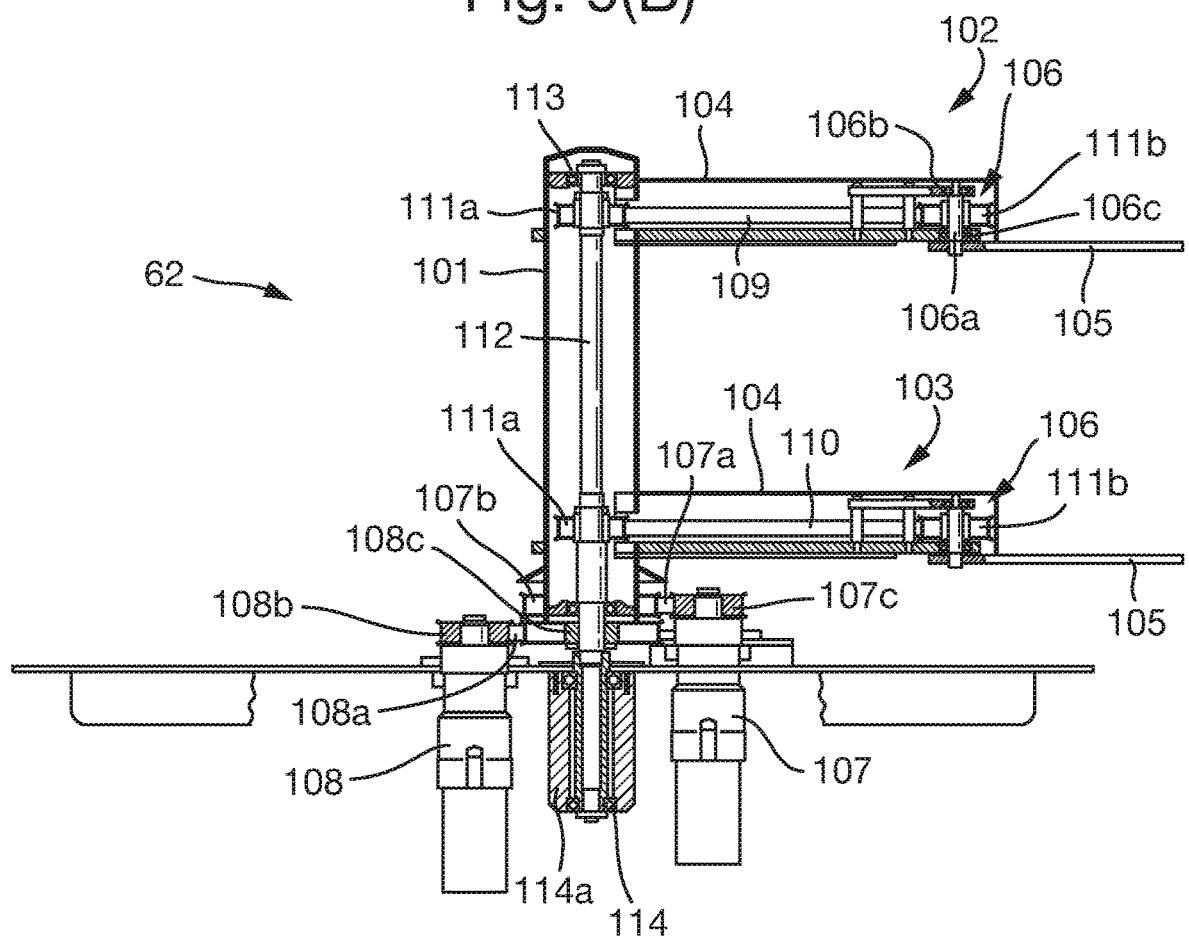

A suitable robot arm 62 is shown in more detail in FIGS. 9A and 9B. The arm includes a vertical, external shaft 101 with upper and lower arms 102, 103, extending perpendicularly from the external shaft 101. Each arm 102, 103 comprises a first and second portion 104, 105, the second portion 105 being mounted for horizontal, rotatable movement relative to the first portion 104 about a pivot 106. Each pivot 106 comprises an axle 106a rigidly connected to a first end of the second arm portion 105 and extending into a distal end of the first arm portion 104. The axle 106a is mounted rotatably within the distal end of the first arm portion by upper and lower bearings 106b, 106c. The upper and lower arms are substantially identical, and the pivot 106 of each arm is located on the same vertical axis. The upper arm 102 holds at the distal end of its second portion 105 a water jet 42 (not shown in FIGS. 9A and 9B) and the lower arm 103 holds at the distal end of its second portion 105 a collection tube 46 (not shown in FIGS. 9A and 9B).

The first portion 104 of each arm is rigidly connected to the external shaft 101. The external shaft 101 may be driven, at its base, to rotate by a first motor 107 coupled via a drive belt 107a and first and second pulleys 107b, 107c, thereby rotating the rigidly connected upper and lower arms 102, 103 in synchronisation about the axis of the external shaft, and hence moving the water jet 42 and collection tube 46 along the periphery of a circle centred on the axis of the external shaft 101.

The second portion 105 of each arm may further be moved relative to the first portion 104 using a second motor 108. The second motor 108 rotates an internal shaft 112 arranged coaxially inside the external shaft 101 and extending between upper and lower bearings 113, 114. The internal shaft 112 extends from beneath the bottom of the base of the external shaft 101, where it is mounted by the lower bearing 114 to the inside of the lower bearing housing 114a, along substantially the entire length of the external shaft 101, to the top of the external shaft, in which it is mounted internally by the upper bearing 113. The second motor 108 is coupled to the internal shaft 112 beneath the external shaft 101 via a drive belt 108a and first and second pulleys 108b, 108c. As the internal shaft 112 is rotated by the second motor 108, it simultaneously drives upper and lower belts 109, 110 in the upper and lower arms 102, 103 respectively. These upper and lower belts are connected to the internal shaft by a respective first pulley 111a at one end, and via a respective pulley 111b to the axle 106a of the pivot 106 between the two arm portions at the other end. Rotation of the internal shaft 112 causes the belts 109, 110 to turn their respective pulleys 111a, 111b at the same rate, thereby simultaneously moving the second portions 105 of both arms relative to the first portions 104. This second motor 108 therefore moves the water jet 42 and the collection tube 46 along the periphery of a circle centred on the pivot 106 between the two arm portions, while maintaining the position of the water jet 42 directly above the collection tube 46. Using both motors 107, 108, simultaneously the water jet 42 may be moved to any point in a plane over the food piece 10 and the collection tube 46 moved to remain directly beneath the water jet.

The invention claimed is:

1. A method of removing a foreign object from a food piece comprising detecting the location of a foreign object in a food piece; conveying the food piece to a cutting tool, which generates a liquid jet; operating the cutting tool to cut around the detected location of the foreign object with the liquid jet, and subsequently operating the cutting tool to engage and eject the foreign object from the food piece with the liquid jet, wherein conveying the food piece to the cutting tool comprises conveying the food piece on a conveyor, wherein the conveyor has a gap which remains beneath the foreign object as the food piece is cut by the cutting tool, and wherein engaging and ejecting the foreign object from the food piece comprises ejecting the foreign object downwardly through the gap in the conveyor, and wherein the food piece is cut and the foreign object ejected by the cutting tool while the food piece bridges the gap in the conveyor.

2. A method according to claim 1, wherein the cutting tool is controlled to create an outwardly tapering bore around the foreign object.

3. A method according to claim 1, wherein the detecting comprises an X-ray analysis to determine co-ordinates of the foreign object in the food piece.

4. A method according to claim 1, further comprising a second detecting, after the cutting and the ejection, for confirming an absence of the foreign object in the food piece.

5. A method according to claim 1, wherein the cutting is carried out while the food piece is being conveyed, the cutting tool being moved in a controlled manner in a direction transverse to the direction of movement of the food piece.

6. A method according to claim 1, wherein the cutting is carried out by moving the cutting tool along two different axes.

7. A method according to claim 1, the method being performed automatically with co-ordinates of the foreign object location being transmitted to the cutting tool and the food piece being transported to the cutting tool by a transport system.

8. A method according to claim 1, wherein conveying the food piece to the cutting tool comprises conveying the food piece on a conveyor, wherein the conveyor has a gap which remains beneath the foreign object as the food piece is cut by the cutting tool, and wherein engaging and ejecting the foreign object from the food piece comprises ejecting the foreign object downwardly through the gap in the conveyor, and wherein the food piece is cut and the foreign object ejected by the cutting tool while the food piece bridges the gap in the conveyor.

9. A method according to claim 1, wherein operating the cutting tool is performed using a control system.

10. A method according to claim 1, wherein cutting around the detected location of the foreign object comprises cutting a hole in the food piece entirely around the detected location of the foreign object.

11. A method according to claim 1, further comprising detecting a shape of the foreign object, wherein the shape of the cut is varied so as to correspond to the detected shape of the foreign object.

12. A food piece handling assembly comprising an analysis unit for detecting the location of a foreign object in a food piece; a cutting tool, which generates a liquid jet; a transport system for transporting food pieces from the analysis unit to the cutting tool; and a control system for controlling the transport system and cutting tool and responsive to the detected location of a foreign object in a food piece to operate the cutting tool to cut around the detected location of the foreign object with the liquid jet, and subsequently to operate the cutting tool to engage and eject the foreign object from the food piece with the liquid jet, wherein the transport system comprises a conveyor for conveying the food piece to the cutting tool, wherein the conveyor has a gap configured to remain beneath the foreign object as the food piece is cut by the cutting tool, and wherein the control system operates the cutting tool to engage and eject the foreign object downwardly through the gap in the conveyor, and wherein the control system controls the transport system and the cutting tool such that the food piece is cut and the foreign object ejected by the cutting tool while the food piece bridges the gap in the conveyor.

13. An assembly according to claim 12, wherein the analysis unit comprises an X-ray analysis device.

14. An assembly according to claim 12, wherein the cutting tool is mounted on a robot arm for movement in one or two axes.

15. An assembly according to claim 12, wherein the transport system further transports the food pieces from the cutting tool to the analysis unit for confirmation of an absence of the foreign object.

16. An assembly according to claim 12, wherein the transport system comprises at least two conveyors, wherein two of said conveyors define a gap therebetween, and wherein the two conveyors are controllable by the control system to move the position of the gap such that in use the gap remains beneath the foreign object as the food piece is cut by the cutting tool.

17. An assembly according to claim 16, wherein each of the two conveyors comprises a conveyor belt entrained about four rollers, and wherein the four rollers comprise a first fixed roller, a second fixed roller, a first movable roller and a second movable roller, wherein each of the movable rollers is movable in a direction orthogonal to its axis, the first and second movable rollers being maintained at a fixed vertical and horizontal displacement with respect to one another, and wherein the entrained conveyor belt follows a path from the first fixed roller to the first movable roller, the portion of the belt extending from the first fixed roller to the first movable roller defining a food piece carrying portion of the conveyor, the entrained conveyor belt extending partly around the first movable roller and then extending to the second movable roller, the entrained conveyor then extending partly around the second movable roller and extending to the second fixed roller, the conveyor then extending back to the first fixed roller, and wherein movement of the first and second movable rollers extends and contracts a length of the food piece carrying portion of the conveyor while maintaining the conveyor belt in a taut configuration.

18. An assembly according to claim 17, wherein each of the first and second movable rollers on both of the two conveyors is mounted on a common carriage, and wherein the carriage is movable back and forth.

19. An assembly according to claim 16, wherein the control system operates the cutting tool to eject the foreign object downwardly through the gap between the conveyors.

20. An assembly according to claim 12, wherein the control system operates the cutting tool to cut a hole in the food piece entirely around the detected location of the foreign object.

21. An assembly according to claim 12, wherein the analysis unit detects a shape of the foreign object, and the control system varies the shape of the cut so as to correspond to the detected shape of the foreign object.

\* \* \* \* \*